United States Patent [19]

Hammer et al.

[11] Patent Number: 4,824,627
[45] Date of Patent: Apr. 25, 1989

[54] METHOD OF MAKING A MOLDED PLASTIC PRODUCT

[75] Inventors: Floyd V. Hammer, R.R. 1, Union, Iowa 50258; Brian Harper, Havant, United Kingdom

[73] Assignee: Floyd V. Hammer, Iowa Falls, Iowa

[21] Appl. No.: 180,381

[22] Filed: Apr. 12, 1988

Related U.S. Application Data

[60] Continuation-in-part of Ser. No. 889,636, Jul. 28, 1986, Pat. No. 4,738,808, which is a division of Ser. No. 798,886, Nov. 18, 1985, Pat. No. 4,626,189.

[30] Foreign Application Priority Data

Sep. 5, 1986 [CA] Canada .................................. 517644
Oct. 16, 1986 [GB] United Kingdom ................ 8624853

[51] Int. Cl.⁴ ...................... B29C 33/34; B29C 45/14; B29C 47/02; B29C 47/60
[52] U.S. Cl. .................... 264/211.21; 249/86; 249/91; 249/165; 264/275; 264/279; 264/279.1; 264/297.3; 264/323; 264/328.14; 264/DIG. 69; 425/113; 425/116; 425/576
[58] Field of Search ...................... 264/37, 40.1, 40.2, 264/40.4, 40.5, 40.7, 140, , 161, 169, 176.1, 211.21, 271.1, 275, 297.3, 310, 328.11, 328.13, 328.14, 334, 323, DIG. 69, DIG. 83, 279, 279.1; 425/113, 116, 145, 147, 150, 173, 215, 218, 376.1, 576, 586, DIG. 16, DIG. 243; 249/86, 91, 95, 160, 165; 241/3

[56] References Cited

U.S. PATENT DOCUMENTS

| | | | |
|---|---|---|---|
| 952,977 | 3/1910 | Case. | |
| 1,102,693 | 7/1914 | Seyler. | |
| 2,026,439 | 12/1935 | Sanial | 425/576 X |
| 2,375,955 | 5/1945 | Smith | 425/377 X |
| 2,702,408 | 2/1955 | Hartland | 264/211.21 |
| 3,416,727 | 12/1968 | Collins | 238/84 |
| 3,500,541 | 3/1970 | Hammerlund, Jr. et al. | 425/377 X |
| 3,593,374 | 7/1971 | Sierd | 264/161 X |
| 3,814,777 | 6/1974 | Schmidt | 264/40.1 |
| 3,908,902 | 9/1975 | Collins et al. | 238/83 |
| 4,105,159 | 8/1978 | Brown | 238/36 |
| 4,134,546 | 1/1979 | Dankert | 238/370 |
| 4,187,352 | 2/1980 | Klobbie | 264/50 X |
| 4,286,753 | 9/1981 | Lee | 238/37 |
| 4,356,968 | 11/1982 | Harmsen | 238/1 |
| 4,490,315 | 12/1984 | Charlebois et al. | 264/40.2 |
| 4,626,189 | 12/1986 | Hammer et al. | 425/147 X |
| 4,652,495 | 3/1987 | Sato et al. | 428/425.5 |
| 4,738,808 | 4/1988 | Hammer et al. | 264/40.1 |

FOREIGN PATENT DOCUMENTS

| | | | |
|---|---|---|---|
| 49-47271 | 12/1974 | Japan | 264/140 |
| 61-197210 | 9/1986 | Japan | 264/275 |
| 572261 | 10/1945 | United Kingdom. | |
| 605867 | 8/1948 | United Kingdom. | |
| 855983 | 12/1960 | United Kingdom. | |
| 1285136 | 8/1972 | United Kingdom. | |
| 1552234 | 9/1979 | United Kingdom | 264/37 |

*Primary Examiner*—Jeffery Thurlow
*Assistant Examiner*—Leo B. Tentoni
*Attorney, Agent, or Firm*—Zarley, McKee, Thomte, Voorhees & Sease

[57] ABSTRACT

The method of the present invention involves taking a comminuted mixture of waste plastic materials, feeding the mixture into a screw extruder capable of applying heat and pressure to the mixture; using the screw extruder to heat the mixture to a temperature of between 350° and 600° Fahrenheit; and forcing the molten mixture outwardly through a die opening under a pressure of from 100 lbs. per sq. inch to 600 lbs. per sq. inch into a mold in tightly sealed relationship over the die opening. The mold, after being filled, is removed from the screw extruder, and the mixture is permitted to cool and harden in the mold. The hardened mixture is then removed from the mold.

5 Claims, 6 Drawing Sheets

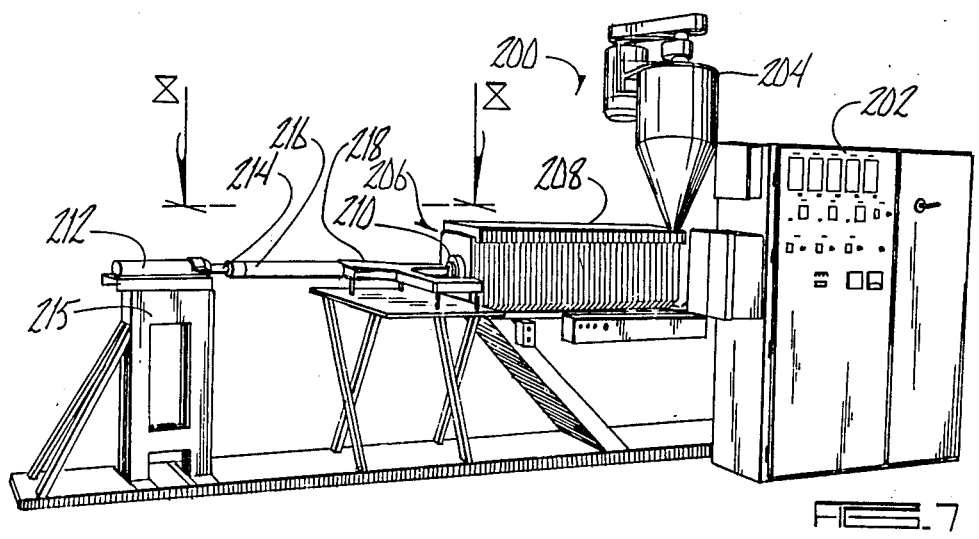
FIG. 7
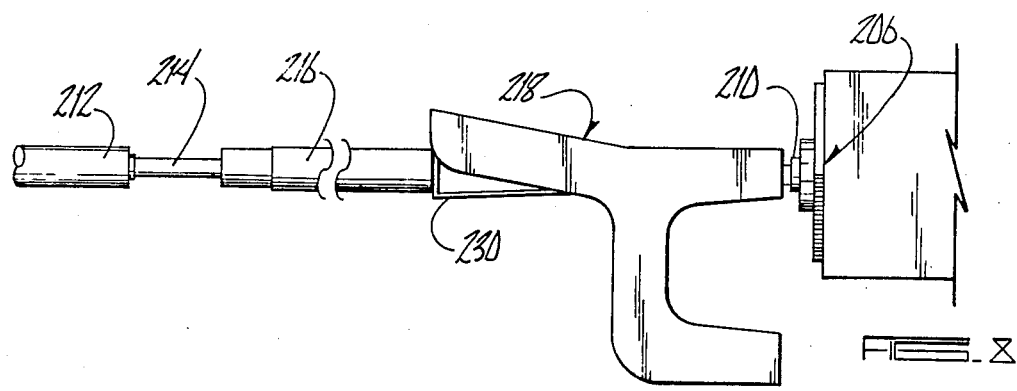
FIG. 8
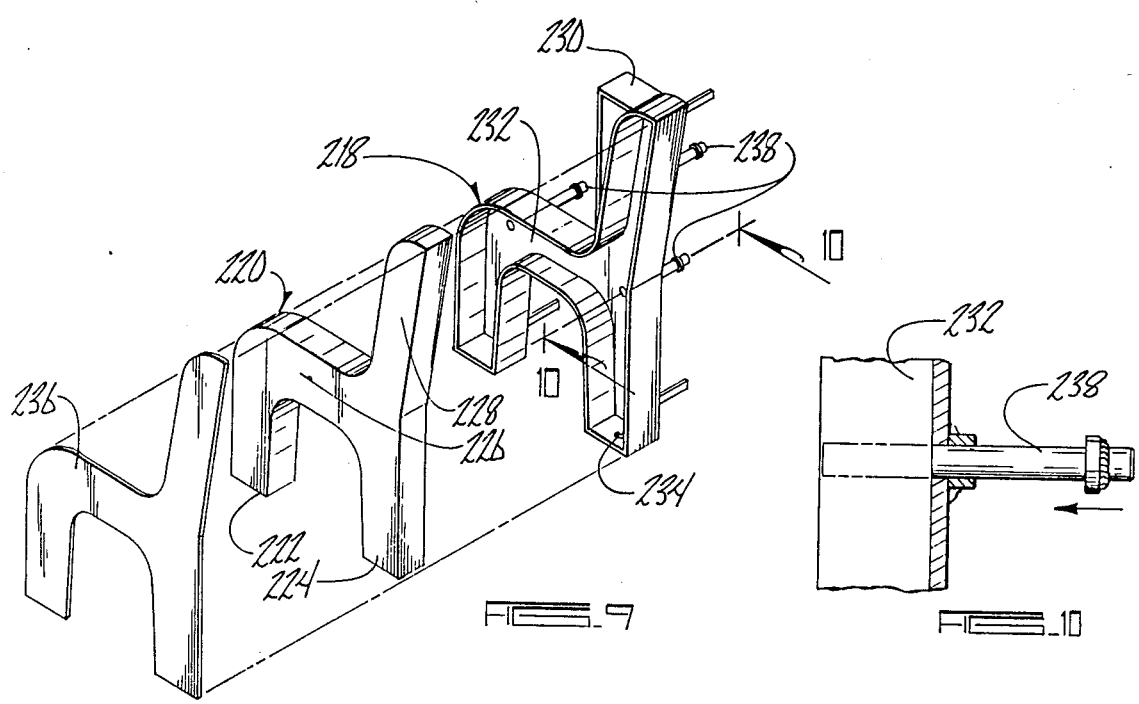
FIG. 9
FIG. 10

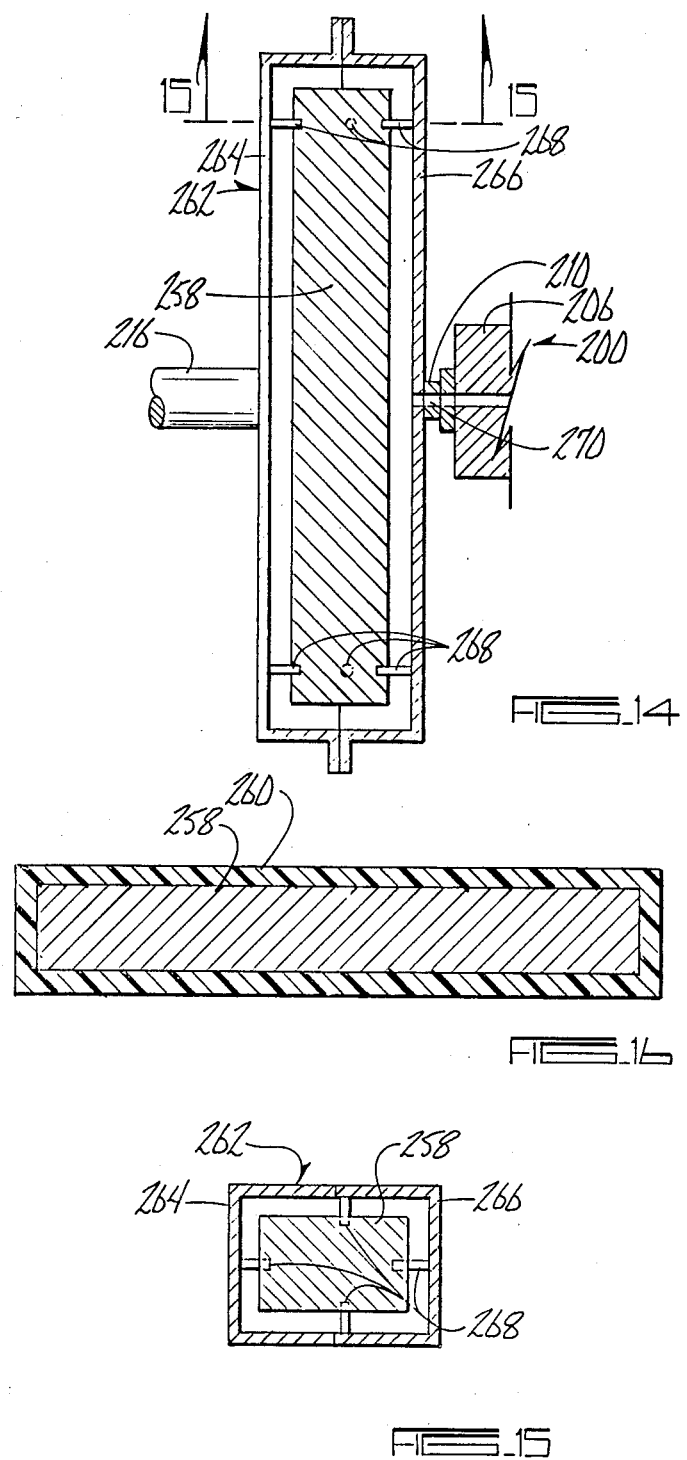

METHOD OF MAKING A MOLDED PLASTIC PRODUCT

BACKGROUND OF THE INVENTION

This application is a continuation-in-part of co-pending application; Ser. No. 889,636, filed July 28, 1986 now U.S. Pat. No. 4,738,808, which is a divisional of application Ser. No. 798,886, filed Nov. 18, 1985, now U.S. Pat. No. 4,626,189.

This invention relates to a method and machine for forming articles from a plastic material. The present invention is particularly adapted for taking waste plastic materials of various heterogeneous make-up and processing these materials into products which have properties similar to wood.

One example of a prior process for working up waste plastic material is known by the name of the "Reverzer" process, introduced by the Japanese Company Mitsubishi Petrochemical, and mentioned in U.S. Pat. No. 4,187,352. According to this process, sorted or unsorted thermoplastic waste material of, for example, polyethylene, polypropylene, polyvinylchloride or mixtures thereof, is comminuted and the particulate material is subsequently stored in a storage space. The particulate material is dried to a certain extent, using the heat released during the comminution of the waste material. From the storage space, the particulate waste material is supplied to the "Reverzer" unit, which in essence is a melting unit, comprising a hopper in which the material is softened, and a mixer comprising a screw member, in which the material is also fluidized. The fluid material is then injected under very high pressure into a closed mold and thus molded. The molds are then transported to a cooling space, and cooled by being sprayed with water. The molds are then opened and the molded product is removed. The resulting products may have the form of tapered beams, frames, U-beams, etc., depending upon the mold being used. In this prior process, a very high pressure is built up in the mixing and fluidization stage of the apparatus used, under the influence of which, as stated, the fluid material is injected into a special pressure resistant mold.

Klobbie U.S. Pat. No. 4,187,352, discloses a method for working up thermoplastic plastic synthetic material into shaped particles in which specially adapted pressure resistant apparatus is unnecessary, but commercially available non-pressure resistant apparatus and dies or molds can be used.

The Klobbie patent discloses apparatus in which the synthetic material is subjected to a mixing operation in a housing comprising a screw member, and is fluidized, molded, cooled in the mold, and removed from the mold. The synthetic material is supplied to an extruder without a screen pack and without an extrusion nozzle. The mold into which it is extruded is open at both ends so that the fluid is not under pressure within the mold. Molding pressure is obtained by mixing with the particulate synthetic material a blowing agent, the threshold temperature of which is exceeded at the temperature occurring in the extruder. The blowing agent causes gas to be propagated so as to increase the pressure within the mold, thereby causing the plastic material to assume the shape of the mold.

Therefore, a primary object of the present invention is the provision of an improved machine and method for reprocessing waste polymers to create a molded product under low pressure.

A further object of the present invention is the provision of a machine and process which utilizes low pressure so as to permit the use of an inexpensive mold, but at the same time using a pressure which is higher than that shown in the Klobbie reference referred to above.

A further object of the present invention is the provision of a machine for molding waste polymers which creates a molding pressure within the extruder by use of a nozzle and an optional screen pack.

A further object of the present invention is the provision of an improved machine for processing waste polymers wherein the polymers can be contaminated with various impurities.

A further object of the present invention is the provision of a machine for processing waste polymers which includes a closure device for closing off the ends of the molds during the molding process.

A further object of the present invention is the provision of a machine for molding waste polymers at a low pressure, but which provides sufficient molding pressure without the need of a blowing agent as shown in the Klobbie patent.

A further object of the present invention is the provision of a machine which includes an automatic fill sensing device which senses when the mold is full and causes it to be indexed away from the extruder.

A further object of the present invention is the provision of a machine for processing waste polymers which utilizes a heating band to cause the waste polymers to achieve a fluid state for extruding.

A further object of the present invention is the provision of a method of molding large and irregularly shaped objects at pressure of from 100 psi square to 600 psi.

A further object of the present invention is the provision of a method of molding objects embedded within the plastic molding material at relatively low pressure from 100 psi to 600 psi.

A further object of the present invention is the provision of a machine which is economical to manufacture, durable in use and efficient in operation.

SUMMARY OF THE INVENTION

The present invention provides a machine for forming products out of waste polymer materials by utilizing a molding pressure substantially greater than that shown in the Klobbie patent referred to above, but substantially less than the high pressure molding referred to in the "Reverzer" process referred to above. As a result, the advantages of molding with a relatively low pressure, i.e., the inexpensive equipment and molds are achieved with the present invention, while at the same time eliminating the disadvantages encountered with the Klobbie process.

The present invention utilizes an extruder having an optional screen pack and nozzle head therein. A heater band surrounds the nozzle so as to supply heat to the plastic material before it is extruded. The use of the screen pack and the nozzle create a higher pressure for the plastic material than the pressure obtained in the Klobbie patent. Pressures in the mold need to be sufficiently high to give good quality moldings. For simple moldings, lower pressures give adequate quality, but if the mold has any detail to be shown, then higher pressures are required. Typically the lowest pressure which would produce acceptable moldings would be approximately 30 psi and the highest pressure would be approximately 600 psi. The preferred pressure is dependent upon the nature of the mold.

The plastic materials which may be molded with the present invention include a variety of materials such as low, medium, or high density polyethylene; polypropylene; polystyrene; ABS; polyamide; and polyester. The input materials can be mixed and can have low quality with a large number of impurities therein such as ground particles of metal.

The present invention utilizes a mold holder which holds a plurality of molds and which indexes the molds one at a time, first to a fill station where the molds receive the plastic material from the extruder, and then to a second station wherein the ends of the mold are closed and the molded material is permitted to cool and harden while under pressure. Between the fill station and the second station, a trimming apparatus is provided for trimming any excess material from the ends of the mold prior to the time that the ends of the mold are closed at the second station.

After filling the machine rotates the mold holder to bring an empty mold to the filling station. The mold is filled, and a sensing device at the end of the mold senses when the mold has been filled.

The full mold is taken to a holding station where it is held closed. Closure at the fill orifice is maintained by a pressure piston which presses the fill opening of the mold against a flat metal plate. At the efflux orifice at the other end of the mold, closure is maintained by the pressure piston pressing against the end plate of the mold. This piston is held in place by a pneumatic cylinder which also generates the pressure to give closure at the inlet orifice.

After the mold has been filled, the plastic that has issued from the mold must be trimmed flush with the end face of the mold, thus allowing a good seal by the mold closing device. This operation is performed by a self-positioning cutter located between the fill station and the holding station.

The nozzle has two functions. It generates a pressure in the extruder and insures complete mixing of the various components of the input material. It also enables the molds to be filled from a relatively small orifice so as to allow such molds to be of relatively small cross-sectional area when compared with the extruder barrel diameter.

Nozzle heater bands are thermostatically controlled so as to hold the extrudant at a fairly constant temperature and so as to give the desired flow properties.

A modified form of the invention utilizes an extruder molding machine without the carousel described above. Instead, a ram is used to press a mold into communication with the outlet opening of the extruder. The extruded plastic is then forced into the mold and fills the mold. It has been found that large and irregularly shaped molds can be utilized with this method while at the same time using molding pressures that are in the range of 100 to 600 pounds per square inch, and are in the preferred range of 300 to 600 pounds per square inch. The temperature may be adjusted to the particular composition of material being molded, but preferably it should be in the range of 350 degrees Fahrenheit to 600 degrees Fahrenheit. The molding of a mixture of polyester, polyethylene, polypropylene, and other impurities such as metal provides a superior result from that obtained with pure homogeneous plastics. The pure plastics tend to "sink" within the mold. That is, they tend to shrink upon curing so that they are substantially smaller than the shape of the mold. However, the combination of waste plastics utilized in the present invention does not experience shrinkage or "sinking" to the extent that is encountered with pure plastics.

In yet another modified form of the present invention, solid objects can be molded and embedded within the plastic material. This is accomplished by suspending the object within the mold and forcing the molten plastic into the mold around the object. In this manner, it is possible to embed metal and/or wooden objects within the plastic. For example, it is possible to embed a metal rod within the plastic, or it is possible to embed a wooden object such as a railroad tie within the plastic. All of this is accomplished at considerably lower pressures than heretofore known in the art.

BRIEF DESCRIPTION OF THE DRAWINGS

FIG. 7 is a perspective view of modified form of the present invention.

FIG. 8 is a plan view taken along line 8—8 of FIG. 7.

FIG. 9 is an exploded perspective view of a mold and molded object which can be produced on the device of FIG. 7.

FIG. 10 is a sectional view taken along line 10—10 of FIG. 9.

FIG. 14 is a sectional view of a further mold which can be utilized with the device of FIG. 7.

FIG. 15 is a sectional view taken along line 15—15 of FIG. 14.

FIG. 16 is a longitudinal sectional view of an object molded with the mold of FIG. 14.

DETAILED DESCRIPTION OF THE PREFERRED EMBODIMENT

Figure 4:
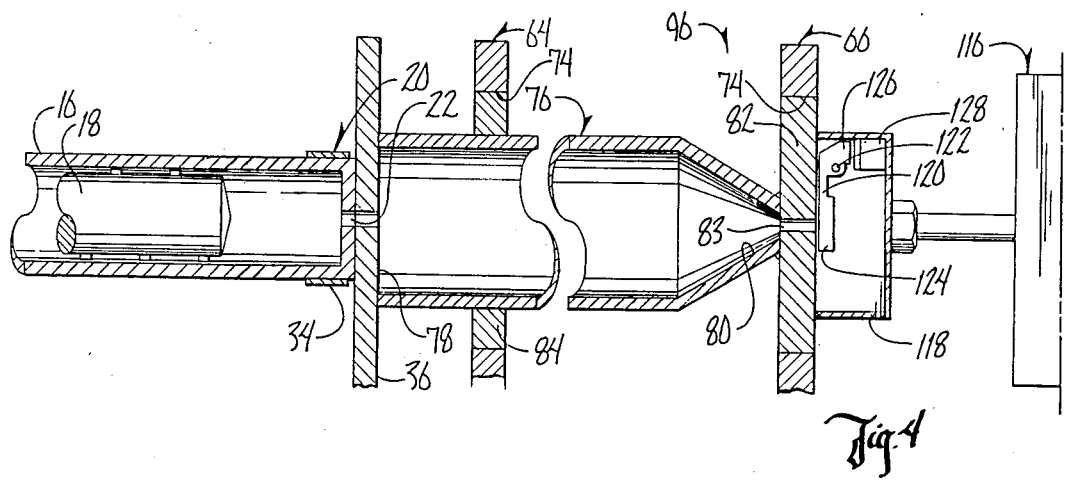
FIG. 4 is a sectional view taken along line 4—4 of FIG. 3.

Referring to the drawings, the numeral 10 generally designates the machine of the present invention. Machine 10 includes a screw extruding machine 12. Extruding machine 12 includes an input hopper 14 for adding the comminuted plastic waste materials which will be extruded through the machine. Extruder 12 includes an extruding barrel 16 (FIG. 4) having a screw 18 therein for driving the plastic material toward the discharge end of the barrel. At the discharge end of the barrel is a nozzle 20 having an extrusion aperture 22 therein.

The nozzle has the function of generating a pressure in the extruder so as to insure complete mixing of the various components of the input material. Furthermore, the nozzle enables the molds to be filled from a relatively small orifice so as to allow the molds to be of a relatively small cross-sectional area when compared with the extruder barrel diameter.

A nozzle heater band 34 surrounds nozzle 20 and is adapted to permit thermostatic control of the temperature of the extruded material, thereby maintaining the material at a constant temperature to obtain the desired flow properties at the nozzle head.

The nozzle is bolted or otherwise operatively secured to a large circular fixed plate 36 which remains stationary with respect to the extruder machine 12. Also attached to the extruding machine 12 is a rectangular tank 38 having side walls 40, 42, end walls 44, 46, and a bottom wall 48. Tank 38 is adapted to hold a water bath or other cooling fluid 50 therein.

Mounted in the bottom of tank 38 are a pair of upstanding pedestals 52, 54 which include bearings 56, 58 at their upper ends for rotatably receiving a tubular shaft 60 therein. Shaft 60 extends rotatably in bearings 56, 58 and also extends rotatably through a sleeve 62 centrally located in circular plate 36.

Mounted on the outside of shaft 60 are a pair of spaced apart carousel plates 64, 66. Each plate 64, 66 includes a cylindrical sleeve 68 having a bushing 70 therein. Threaded within sleeves 68 are tightening rods 72 which are adapted to tighten against bushings 70 so as to clamp plates 64, 66 against sliding movement along shaft 70. The distance between plates 64, 66 may be adjusted by loosening rods 72 and by sliding the plates 64, 66 to the desired relative spaced apart positions.

Each plate 64, 66 includes a plurality of circular openings 74 therein. Mounted within openings 74 and spanning the distance between carousel plates 64, 66 are a plurality of elongated molds 76. Each mold includes a first open end 78 and a second closed end 80. Fitted over end 80 is a closure plate 82 (FIG. 4) having an efflux orifice 84 therein for permitting gases to escape as the mold is being filled. Closure plate 82 is circular and is retentively fitted within the circular opening 74 of carousel plate 66. Open end 78 of mold 76 is fitted against circular plate 36. Welded or otherwise secured to the outer surface of mold 76 is a circular plate 84 which is sized to fit retentively within the opening 74 of carousel plate 64. Thus molds 76 are suspended between carousel plates 64, 66 by means of closure plate 74 and circular plate 84 being fitted within the openings 74 of carousel plates 64, 66. The particular means for holding circular plates 82, 84 in openings 74 may vary, and may include clamps, set screws or other means so as to attach the molds to the carousel plates 64, 66.

Mounted to the end of shaft 60 is a pulley 86. A drive motor 88 includes an output shaft 90 having a pulley 92 thereon. A belt 94 is trained around pulley 92 and pulley 86 so as to provide driving connection between motor 88 and shaft 60, thereby providing means for rotating the shaft 60 and the carousel plates 64, 66. A control box 95 is adapted to control motor 88 so as to cause the carousel plates 64, 66 to be moved in increments one at a time which will cause the various molds to move one at a time from a filling station designated by the numeral 96 in FIG. 3 to a holding or hardening station 98, and thence to periodic other stations 100-110 as shown in FIG. 3.

Mounted for sliding movement on the upper edges of side walls 40, 42 of tank 38 is a sliding frame 112 having a pair of cross frame members 114 spanning the distance between side walls 40, 42. Fixed to cross frame members 114 is a fill sensing assembly 116 which includes a fill sensing box 118 positioned in facing relationship to carousel plate 66 at the fill station 96. Fill sensing box 118 is shown in section in FIG. 4 and includes an elongated arm or blade 120 which is pivoted at 122. On the lower end of arm 120 is a balance weight 124 which fits in facing relationship to aperture 83 in closure plate 82 of mold 76. The upper end of arm 120 is provided with a magnet 126 which is normally in engagement with a switching device 128. In their normal position, magnetic reed switch 128 controls motor 88 so that there is no rotational movement of the carousel plates when the mold 76 is at the fill station 96.

Upon actuation of the screw extruding machine, plastic material is extruded outwardly through extrusion aperture 22 into mold 76. As the plastic material begins filling the mold 76, it ultimately begins issuing outwardly through fill sensing aperture 83. When this happens, counterbalance 124 is moved to the right as viewed in FIG. 4, thereby causing magnet 126 to break contact with magnetic reed switch 128. When contact is broker between magnet 126 and magnetic reed switch 128, the extruder is stopped and motor 88 causes the carousel plates 64, 66 to be indexed and moved so that the mold 76 progresses from the fill station 96 to the hardening station 98.

Figure 1:
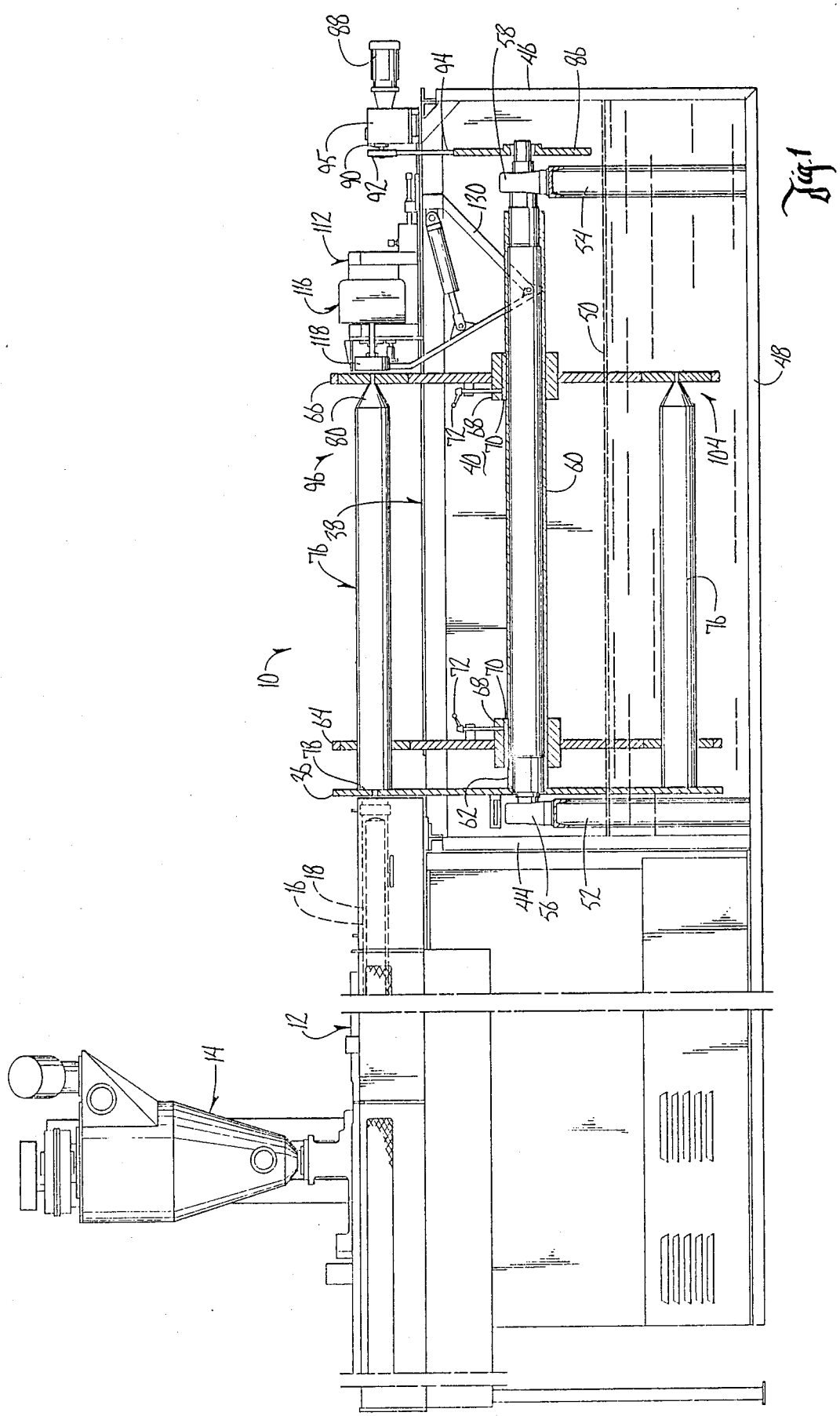
FIG. 1 is a side elevational view of the present invention showing portions thereof in section.
Figure 2:
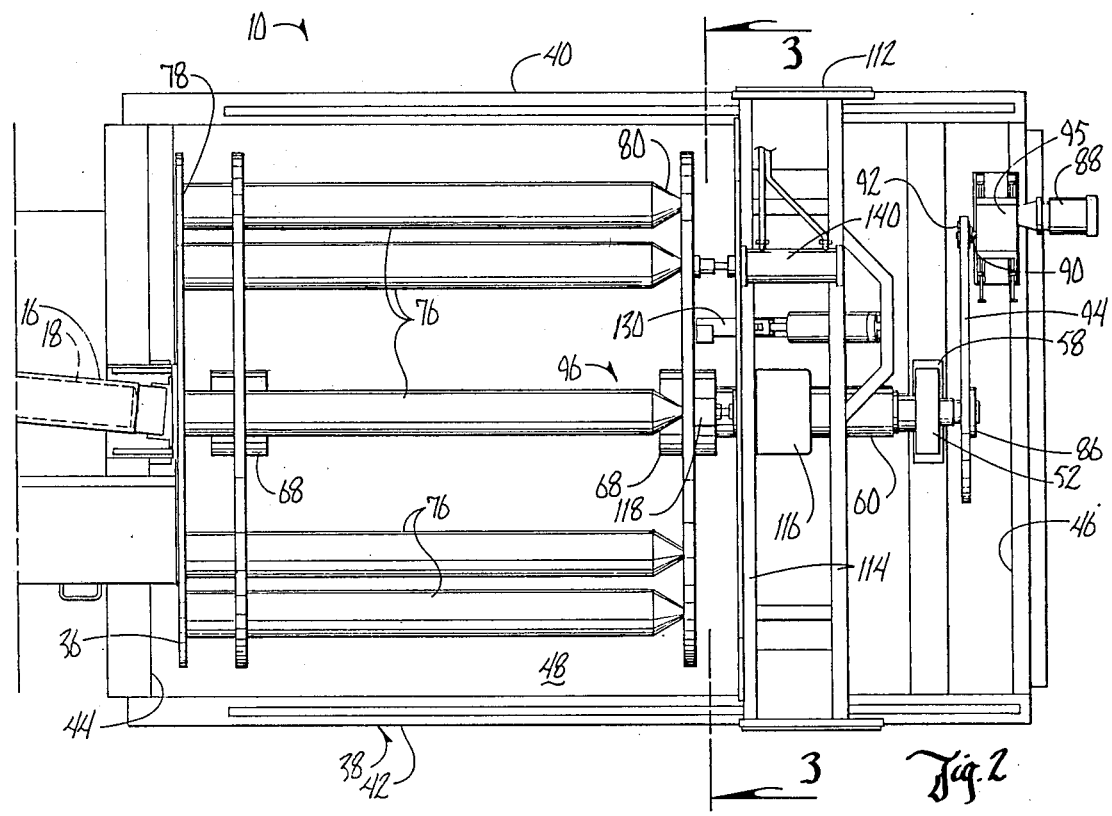
FIG. 2 is a top plan view of the right-hand portion of the device shown in FIG. 1.
Figure 3:
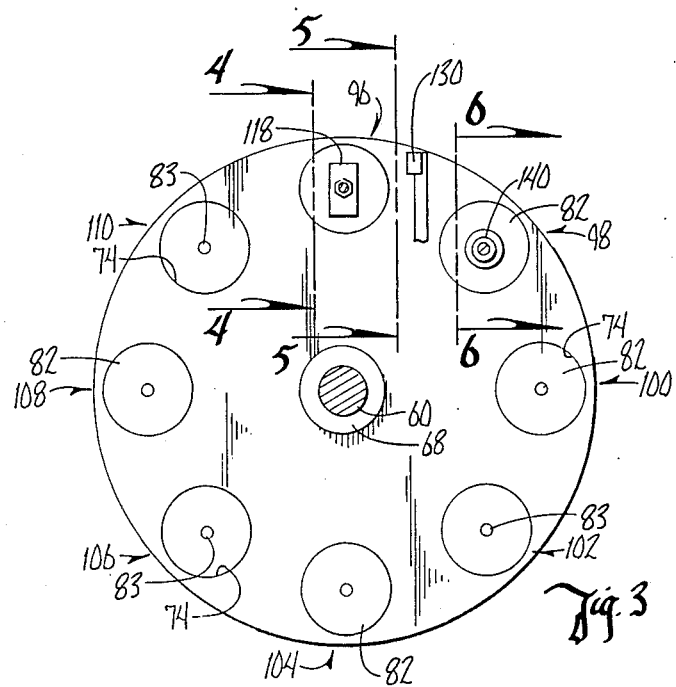
FIG. 3 is a sectional view taken along line 3—3 of FIG. 2.
Figure 5:
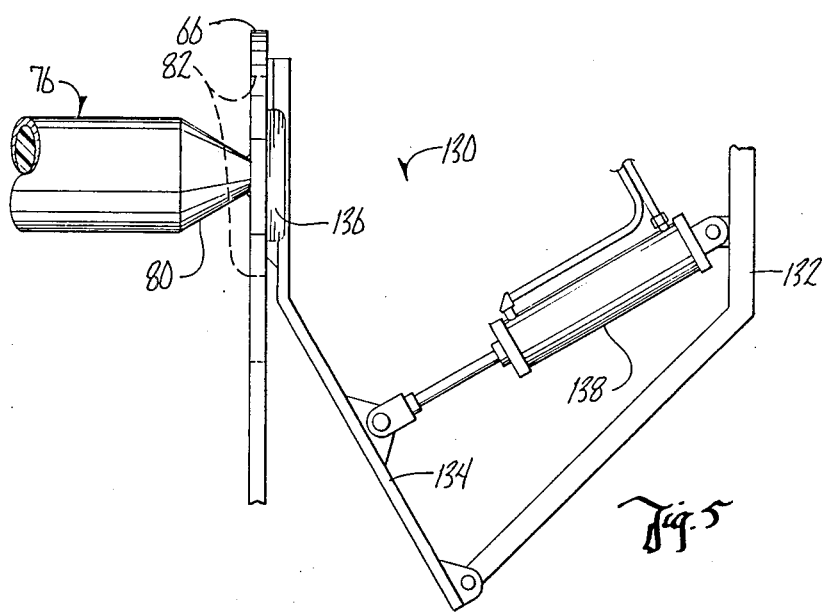
FIG. 5 is a sectional view taken along line 5—5 of FIG. 3.
Figure 6:
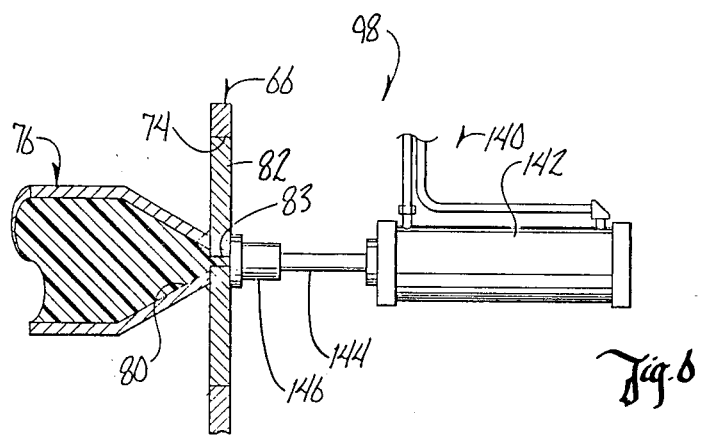
FIG. 6 is a sectional view taken along line 6—6 of FIG. 3.

Positioned between fill station 96 and hardening station 98 is a sprue cutting device 130 shown in FIGS. 2, 3 and 5. Sprue cutting device 130 includes a base frame 132 which is fixed to sliding frame 12 and which extends downwardly therefrom. At the lower end of base frame 132 is pivoted a knife arm 134 having a knife blade 136 thereon. A hydraulic or pneumatic cylinder 138 is connected at one of its ends to base frame 132 and at the other of its ends to knife arm 134. Cylinder 138 maintains knife blade 136 in facing relationship to the outer surface of closure plate 82, and is adapted to trim any resin that has issued from the orifice 83 of the mold. As the mold moves from the fill station 96 to the hardening station 98, the blade 136 wipes along the surface of closure plate 82 and trims the mold flush with the end face.

Mounted at the hardening station 98 is a mold closing device 140. Device 140 includes a cylinder 142 which is rigidly mounted with respect to sliding frame 112. Cylinder 142 includes a rod 144 having at its outer end a circular pad 146 adapted to fit in sealing engagement over fill sensing aperture 83. When the mold 76 reaches the hardening station 98 it stops, and cylinder 142 is extended so that pad 146 fits in sealing engagement over aperture 83. The pad 146 also exerts axial pressure on mold 76 so as to cause the open end 78 of mold 76 to be tightly fitted against the surface of fixed plate 36. Thus, both ends of mold 76 are closed by virtue of the pneumatic cylinder 142 during the time that the mold is at hardening station 98.

At the same time, the mold immediately following mold 76 is now at the fill station and is being filled. With the next indexing of the carousel plates, the second mold comes to the hardening station and the first mold progresses downwardly toward the bath 50 with tank 38. By this time the plastic material has hardened within mold 76 and does not require closure at the opposite ends of the mold 76.

After the molds have been more thoroughly cooled by subjecting them to the cooling bath 50, they can be emptied and used again for the forming of additional products.

The present invention thus permits the molds to be filled at a relatively low pressure, so as to eliminate the need for more expensive molds used in the high pressure molding techniques. However, the present invention permits the molds to be filled under somewhat greater pressure than that achieved with the Klobbie patent discussed above. There is therefore no need for a blowing agent to provide the molding pressure within the mold. The fill sensing device provides an improved method for determining when the mold is full and automatically signaling the machine to index the mold to the next station. The trimming blade and apparatus 130 trims the end of the mold automatically so as to insure a tight seal when the mold is positioned in the hardening station. At the hardening station, the mold is closed at both ends so as to permit the molded material to completely harden with both ends of the mold closed.

Referring to FIG. 7 the numeral 200 generally designates a screw extrusion machine similar to screw extruding machine 12. Machine 200 includes a control console 202, an input hopper 204 for adding the comminuted plastic waste materials which will be extruded through the machine, and a screw extruder designated generally by 206. Extruder 206 includes a plurality of heating elements 208 around the outer surface thereof which can be controlled by console 202 so as to provide the desired temperature for molding various types of plastic comminuted materials. Extruder 206 includes an extrusion die 210 through which the plastic material is forced for molding.

Supported in spaced apart relation to extruder die 210 is a hydraulic cylinder 212 having a ram 214 mounted therein for telescopic movement in response to actuation of cylinder 212. Ram 214 is mounted for movement along a line which is substantially registered with the axis of extrusion die 210. Cylinder 212 is held in fixed relation to extrusion die 210 by a support frame 215.

Mounted between extrusion die 210 and ram 214 are a cylindrical spacer block 216 and an irregularly shaped mold 218. Mold 218 is formed into a shape for the frame of a bench which is designated by the molded bench frame 220 (FIG. 9) having a pair of spaced apart legs 222, 224, an upstanding back 228 and a horizontal support surface 226. Frame 218 includes an L-shaped bracket 230 which is adapted to fit against spacer block 216 so that, when extended, ram 214 exerts a force directly through spacer block 216, L-shaped bracket 230, and mold 218 to the die 210 of the extruder 206.

Mold 218 includes a hollow mold section 232 having an inlet opening 234 at one end thereof. A cover plate 236 is adapted to fit in covering relation over hollow frame 232 to provide a complete enclosure therein. Clamps or other securing means can be used to secure cover plate 236 tightly in covering relation over the open end of hollow frame 232. A plurality of knockout bolts 238 are slidably fitted within hollow frame 232 for facilitating the removal of the molded bench frame after the molding is complete.

In order to mold the bench frame 220 it is necessary to place the mold 218 between the spacer block 216 and the die 210. The inlet opening 234 of frame 218 is placed in registered alignment with die 210 so as to permit the molten plastic material issuing from die 210 to enter the interior of mold 218. Mold 218 is held in place by extending the cylinder 212 and the ram 214 so as to press spacer block 216 against frame 218.

Comminuted waste plastic material is then placed within hopper 204 and the screw extrusion machine 200 is actuated and controlled by console 202. The comminuted waste plastic materials may be those which are conventionally produced by various plastic waste materials such as beverage containers. It may include polyester, polyethylene, polypropylene. It also may include other foreign waste materials such as metal coming from the bottle caps of beverage containers. While it is not necessary that all of the above materials be included in the comminuted material, it is preferable that at least two of the above materials be included.

The extruder is used to heat and apply pressure to the comminuted material and thereby produce a molten plastic material which is forced outwardly through the die 210. The pressure applied by the extruder may vary from as low as 100 lbs. per sq. inch to as high as 600 lbs. per sq. inch. Preferably the pressure should be approximately 300 to 600 lbs. per sq. inch. The temperature also can be adjusted to produce the best results with the particular combination of material being molded. The molding temperature should vary from approximately 350 degrees Fahrenheit to approximately 600 degrees Fahrenheit.

The extruder is then actuated so as to force the molding material into the mold 218. The desired molding pressure within mold 218 can be achieved by varying the pressure with which ram 214 holds the mold 218 against the die 210. Exerting a lesser force will result in the mold filling with a lesser pressure and exerting a greater force with the ram 214 will result in the mold 218 being filled to a greater molding pressure.

After mold 218 is full the mold is removed and the material therein permitted to cure and harden. Knockout bolts 238 are then used to remove the molded object 220. Under the method of the present invention, the mixture is maintained free from a blowing agent other than the air which naturally forms in the mixture while passing through the screw extruder.

The present invention permits the molding of large and complicated irregular objects at a very low molding pressure. Prior to the present invention such large and complicated objects required molding at very high pressures. However, by utilizing the combination of molding materials and by utilizing the extruding machine 200 and the ram 212 it is possible to mold objects at very low pressures ranging from 100 p.s.i. to 600 p.s.i.

Figure 11:
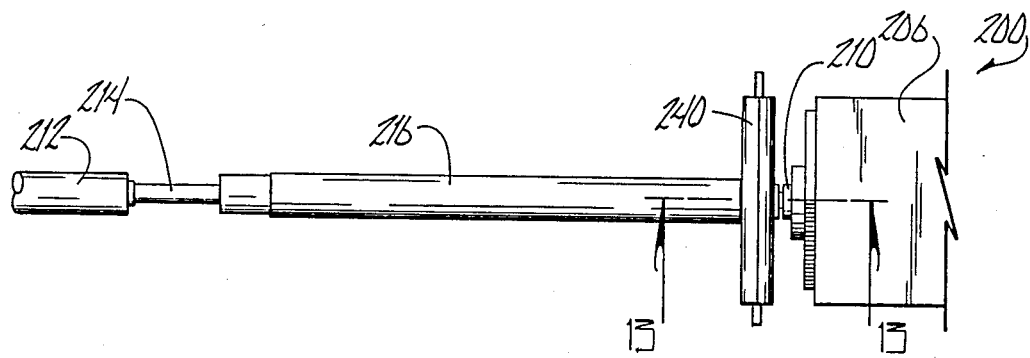
FIG. 11 is an elevational view of a different mold which can be used with the device of FIG. 7.
Figure 12:
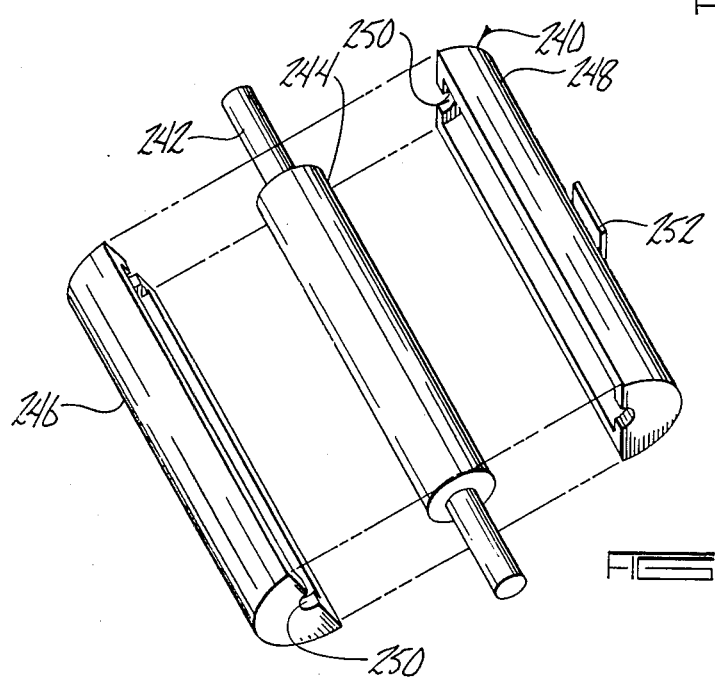
FIG. 12 is a perspective exploded view of the mold and molded object shown in FIG. 11.
Figure 13:
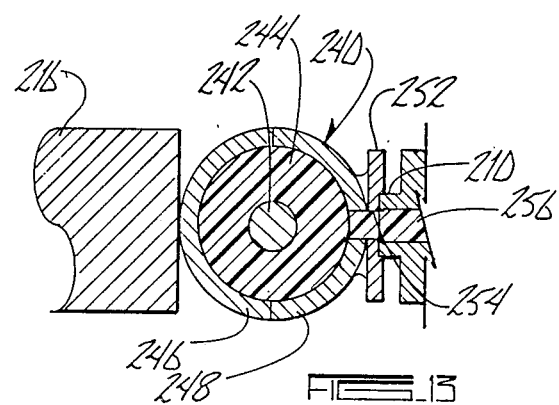
FIG. 13 is a sectional view taken along line 13—13 of FIG. 11.

Referring to FIGS. 11-13 a further type of mold 240 is shown in use with the extruding machine 200. Mold 240 can be used to mold a foreign object such as metal bar 242 within a plastic molded body 244. Mold 240 comprises two mold halves 246, 248 each having semi-circular openings 250 adapted to fit around and receive metal bar 242. Mold half 248 includes a flat flange 252 which is adapted to fit against the die 210. Flange 252 includes a molding inlet opening 254 which permits the molding compound (designated by the numeral 256 in FIG. 13) to enter from die 210 into the mold 240.

The molding process is essentially the same as for the device shown in FIGS. 8-10. The material is forced through die 210 into the mold at a pressure of from 100 to 600 lbs. per sq. inch and at a temperature of from 350 degrees Fahrenheit to 600 degrees Fahrenheit. The pressure within mold 240 is controlled by the force exerted by cylinder 212 and ram 214. It has herefore been unknown in the art to be able to mold an object such as body 244 with a foreign object such as bar 242 embedded therein at pressures as low as 100 to 600 lbs. per sq. inch.

Referring to FIGS. 14–16, a large wooden object such as railroad tie 258 is shown molded within a plastic material designated by the numeral 260 in FIG. 16. This construction can be valuable for items such as railroad ties, poles, pilings, posts, and the like which are exposed to the elements and which can rot and deteriorate with time. By molding the railroad tie 258 within a plastic 260 it is possible to preserve the railroad tie over much longer periods of time then presently possible. While methods for extruding small wooden objects within plastic are known in the art, it is has not been known how to mold large objects such as railroad tie 258 within plastic. The present invention makes such molding possible.

Referring to FIG. 14, a mold 262 comprising mold halves 264, 266 is placed between the extruder die 210 and the spacer block 216 of cylinder 212 and ram 214 (not shown). Within the mold halves 264, 266 is the railroad tie 258. A plurality of spacer pegs 268 extend from railroad tie 258 to the walls of the mold 262 as is illustrated in FIGS. 14 and 15. Pegs 268 are preferably made from plastic so that they will ultimately become part of the plastic material 260 surrounding railroad tie 258.

The extruder 200 is then actuated to force the molten plastic into the mold 262 through an inlet orifice 270. The pressure within the mold 262 is controlled by the force with which the cylinder 212 and the ram 214 exert against the mold 262. Preferably this pressure should be between 300 p.s.i. and 600 p.s.i., and the molding temperature should be maintained between 350 degrees Fahrenheit and 600 degrees Fahrenheit.

The molding compound fills the space within the molds and surrounds the railroad tie 258. The plastic pegs 268 partially melt and form integrally with molding plastic so as to create the plastic material 260 shown in FIG. 16. The railroad tie 258 is thus embedded within the plastic through a molding process.

While the process described above is a manual process for molding railroad tie 258 in plastic, it is also possible to fully automate the molding process by utilizing the carousel molding machine 10 with a plurality of elongated molds containing railroad ties. In such applications the mold filling hole 270 is at the end of the mold so as to fit against nozzle opening 22. Also the opposite end of the mold is open and is pressed against plate 82 (FIG. 4) for molding in accordance with the method set forth for the device of FIGS. 1–6.

Thus, it can be seen that the device accomplishes at least all of its stated objectives.

What is claimed is:

1. A method for molding plastic objects comprising:
   taking a combination of waste plastic materials which have been ground into a comminuted mixture, said combination of plastic materials comprising at least two materials selected from a group of materials consisting essentially of polyester, polyethylene, polypropylene, and metal;
   feeding said mixture into a hopper of a screw extruder capable of applying heat and pressure to said mixture;
   using said screw extruder to heat said mixture to a temperature of approximately 350 degrees–600 degrees Fahrenheit whereby said mixture will melt and to force said molten mixture outwardly through a die opening under a pressure of from approximately 100 lbs. per sq. inch to 600 lbs. per sq. inch;
   holding the inlet opening of a mold in tightly sealed relationship over said die opening so as to receive said molten mixture issuing from said die opening, said mold having an enclosed cavity in communication with said inlet opening for receiving said molten mixture;
   continuing to use said screw extruder to force said molten mixture through said die opening and said inlet opening into said enclosed cavity of said mold until said mold is completely filled with said molten mixture at a pressure of from 100 to 600 p.s.i.;
   removing said mold from said screw extruder after said cavity is filled;
   permitting said mixture within said mold to cool and harden;
   removing said hardened mixture from said mold.

2. A method according to claim 1 and further comprising maintaining said mixture free from a blowing agent other than the air which naturally forms in said mixture while passing through said screw extruder.

3. A method according to claim 1 comprising using a complex mold having an irregularly shaped cavity therein, said mold being comprised of at least two separate parts, and separating said mold parts from one another in order to remove said hardened mixture from said mold.

4. A method according to claim 1 comprising using a mold having a foreign object within said cavity whereby said molten mixture will surround and embed said foreign object therein when said molten mixture fills said cavity and said foreign object will be embedded within said hardened mixture.

5. A method according to claim 4 comprising holding said foreign object in spaced relationship to said mold during the time that said screw extruder forces said molten mixture into said cavity whereby said molten mixture will completely surround and enclose said foreign object.

* * * * *